United States Patent [19]

Hanson

[11] 4,036,049
[45] July 19, 1977

[54] METHOD FOR DETERMINING ENGINE MOMENT OF INERTIA

[75] Inventor: Richard Eric Hanson, Winchester, Mass.

[73] Assignee: The United States of America as represented by the Secretary of the Army, Washington, D.C.

[21] Appl. No.: 700,650

[22] Filed: June 28, 1976

[51] Int. Cl.² .......................................... G01M 15/00
[52] U.S. Cl. .......................................... 73/116; 73/65
[58] Field of Search ................... 73/116, 133 R, 117, 73/65

[56] References Cited

U.S. PATENT DOCUMENTS 3,592,053  7/1971  Lucia .................................. 73/116

Primary Examiner—Jerry W. Myracle
Attorney, Agent, or Firm—Peter A. Taucher; John E. McRae; Nathan Edelberg

[57] ABSTRACT

A method for determining the rotational moment of inertia of an engine, comprising the steps of carrying out engine deceleration tests, first with the engine unloaded and later with the engine sufficiently loaded to provide a recordable difference in deceleration rate (or elapsed time). Moment of inertia is determined as the numerical value of the added load divided by the difference in deceleration rates, before and after the load is applied.

1 Claim, No Drawings

METHOD FOR DETERMINING ENGINE MOMENT OF INERTIA

The invention described herein may be manufactured, used, and licensed by or for the Government for governmental purposes without payment to me of any royalty thereon.

BACKGROUND AND SUMMARY OF INVENTION

U.S. patent application Ser. No. 516,503 filed Oct. 21, 1974 now U.S. Pat. No. 3,964,301 and U.S. patent application Ser. No. 569,857 filed Apr. 21, 1975 now U.S. Pat. No. 3,942,365 disclose means and method for determining brake torque, friction torque and indicated torque of engine type power plants. The mechanisms and methods described in those patent applications presuppose advance knowledge of the rotational moment of inertia of the engine power plant under test. The present invention discloses a method for power testing an engine power plant to determine its moment of inertia when moment of inertia information is unavailable from the power plant manufacturer.

The present invention contemplates the use of a dynamometer for applying predetermined loads on the engine during one of the test runs. However a feature of the invention is that the load-applying mechanism (dynamometer) is a low cost relatively small capacity unit. For example, the applied load need only be approximately 2 per cent of the engine torque capability. With a large engine of approximately 1000 horsepower rating the selected dynamometer could be a relatively small 20 horsepower unit. Such a unit possesses advantages in such respects as size, cost and convenience.

THE DRAWINGS

This invention can be practiced using conventional state-of-the art apparatus. Therefore no drawings are included herein.

Test procedures disclosed in aforementioned patent applications, Ser. Nos. 516,503 and 569,857 include the steps of running an unloaded engine up to some safe operating speed, e.g. 2500 r.p.m., and de-energizing the engine to produce a controlled deceleration to some lower speed, e.g. 1000 r.p.m. Elapsed time to go from the high speed to the low speed is measured, to provide an indication of the average deceleration rate. The friction torque of the engine (power plant) is calculated according to the equation:

$$F_E = I \times d_1$$

where
  $F_E$ is friction torque
  $I$ is moment of inertia, and
  $d_1$ is deceleration rate The present invention contemplates a second test of the engine with a small external load or power absorption device (e.g. generator or fluid coupling unit) attached to the power plant output. The external load, when added to the engine friction torque, causes the power plant to have a different deceleration rate during the second test. The equation prevailing during the second test is:

$$F_E + F_A = I \times d_2$$

where
  $F_A$ represents the added external load, and
  $d_2$ is deceleration rate during the second test.
Substituting the initial value of $F_E$ into the second equation, we have:

$$I \times d_1 + F_A = I \times d_2$$

This can be rearranged to:

$$I = F_A/(d_2 - d_1)$$

The three quantities on the right side of this equation are known or can be determined by running successive deceleration tests with the engine loaded and then unloaded. The added external load $F_A$ is preferably and desirably quite small when compared to the torque output of the power plant and its friction torque. For example, if the friction torque is approximately 20 percent of the indicated torque then the added load $F_A$ can be only about 2 percent of the indicted torque. One advantage (or perhaps requirement) is using a low added load is that it does not unduly reduce the deceleration rate. As explained in aforementioned application Ser. No. 516,503, the total elapsed deceleration time for an unloaded engine, going from 2500 r.p.m. to 1000 r.p.m., is only a matter of a few seconds. The added load $F_A$ must not be so large as to unduly shorten deceleration elapsed time beyond the test equipment capability.

The test runs should be carried out with a resonably large differential between the starting high engine speed and ending low engine speed. However the operational speeds must not exceed safe operating values. For many power plants the high starting speed would be about 2500 r.p.m., and the low final speed would be about 1000 r.p.m. Test apparatus would preferably be similar to apparatus shown and described in aforementioned patent applications, Ser. Nos. 516,503 and 569.857.

I wish it to be understood that I do not desire to be limited to the exact details of construction shown and described, for obvious modifications will occur to a person skilled in the art.

I claim:
1. A method of determining the rotational moment of inertia of an engine type power plant, comprising the steps of
  running an unloaded power plant up to a high speed of approximately 2500 r.p.m., de-energizing the power plant of decelerate same from said high speed to a low speed of approximately 1000 r.p.m., and measuring the elaspsed time period, to thereby ascertain the average deceleration rate of the unloaded power plant;
  applying a known external load to the power plant; said external load being approximately 10 percent of the power plant friction torque;
  running the loaded power plant up to the same aforementioned high speed, de-energizing the loaded power plant to decelerate same from the aforementioned high speed to the same aforementioned low speed, and measuring the elasped time period, to thereby ascertain the average deceleration rate of the loaded power plant;
  and calculating the moment of inertia according to the equation $I = F_A/(d_2 - d_1)$
  where
    $I$ is moment of inertia
    $F_A$ is the known external load
    $d_2$ is deceleration rate of the loaded power plant, and
    $d_1$ is deceleration rate of the unloaded power plant.

* * * * *